United States Patent
Shoemaker et al.

(10) Patent No.: US 8,037,230 B2
(45) Date of Patent: *Oct. 11, 2011

(54) PROVIDING A PERIPHERAL COMPONENT INTERCONNECT (PCI)-COMPATIBLE TRANSACTION LEVEL PROTOCOL FOR A SYSTEM ON A CHIP (SOC)

(75) Inventors: Ken Shoemaker, Los Altos Hills, CA (US); Mahesh Wagh, Portland, OR (US); Woojong Han, Phoenix, AZ (US); Madhu Athreya, Saratoga, CA (US); Arvind Mandhani, San Francisco, CA (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,307

(22) Filed: Nov. 16, 2010

(65) Prior Publication Data

US 2011/0078356 A1    Mar. 31, 2011

Related U.S. Application Data

(63) Continuation of application No. 12/156,320, filed on May 30, 2008, now Pat. No. 7,861,027.

(51) Int. Cl.
  *G06F 13/42* (2006.01)
  *G06F 13/20* (2006.01)
  *G06F 13/36* (2006.01)
(52) U.S. Cl. ......... 710/313; 710/105; 710/311; 710/315
(58) Field of Classification Search ............... 710/313
  See application file for complete search history.

(56) References Cited

U.S. PATENT DOCUMENTS

| | | | |
|---|---|---|---|
| 6,694,380 B1 * | 2/2004 | Wolrich et al. | 710/5 |
| 6,810,460 B1 * | 10/2004 | Kirkwood | 710/306 |
| 6,816,938 B2 * | 11/2004 | Edara et al. | 710/305 |
| 7,457,905 B2 * | 11/2008 | Gehman | 710/315 |
| 7,506,089 B2 * | 3/2009 | Cho et al. | 710/110 |
| 2005/0177664 A1 * | 8/2005 | Cho et al. | 710/110 |
| 2005/0289369 A1 | 12/2005 | Chung et al. | |
| 2005/0289374 A1 | 12/2005 | Kim et al. | |
| 2007/0067549 A1 * | 3/2007 | Gehman | 710/315 |
| 2008/0082840 A1 | 4/2008 | Kendall et al. | |

(Continued)

OTHER PUBLICATIONS

Everton Carara, Aline Mello, Fernando Moraes, "Communication Models in Networks-on-Chip," rsp, pp. 57-60, 18th IEEE/IFIP International Workshop on Rapid System Prototyping (RSP '07), 2007.*

(Continued)

*Primary Examiner* — Ryan Stiglic
(74) *Attorney, Agent, or Firm* — Trop, Pruner & Hu, P.C.

(57) ABSTRACT

In one embodiment, the present invention includes an apparatus having an adapter to communicate according to a personal computer (PC) protocol and a second protocol. A first interface coupled to the adapter is to perform address translation and ordering of transactions received from upstream of the adapter. The first interface is coupled in turn via one or more physical units to heterogeneous resources, each of which includes an intellectual property (IP) core and a shim, where the shim is to implement a header of the PC protocol for the IP core to enable its incorporation into the apparatus without modification. Other embodiments are described and claimed.

20 Claims, 2 Drawing Sheets

U.S. PATENT DOCUMENTS

2008/0147858 A1 6/2008 Prakash et al.
2008/0235415 A1* 9/2008 Clark et al. .................. 710/105
2009/0235099 A1 9/2009 Branover et al.

OTHER PUBLICATIONS

U.S. Patent and Trademark Office, Notice of Allowance mailed Apr. 21, 2011 in U.S. Appl. No. 12/841,889.

U.S. Patent and Trademark Office, Office Action mailed Apr. 12, 2011 in U.S. Appl. No. 12/079,185.

Japanese Patent Office, Office Action issued on Aug. 12, 2010 in Japanese patent application No. 2009-127455.

U.S. Patent and Trademark Office, Notice of Allowance mailed on Apr. 14, 2010 in U.S. Appl. No. 12/080,076.

U.S. Patent and Trademark Office, Office Action dated Nov. 13, 2009 with Reply to Office Action filed Feb. 11, 2010 in U.S. Appl. No. 12/080,076.

Sousek, et al., "PCI Express Core Integration with the OCP Bus," CAST Inc., 2006, 15 pages.

Mentor Graphics, "PCI Express to AMBA 3 AXI Bridge IP," Mentor Graphics, Jun. 2007, 2 pages.

U.S. Appl. No. 12/089,076, filed Mar. 31, 2008, entitled "Integrating Non-Peripheral Component Interconnect (PCI) Resources Into a Personal Computer System," by Arvind Mandhani, et al.

U.S. Appl. No. 12/079,185, filed Mar. 25, 2008, entitled "Power Management for a System on a Chip (SoC)," by Woojong Han, et al.

Everton Carara, et al, "Communication Models in Networks-on-Chip," 18th IEEE/IFIP International Workshop on Rapid System Prototyping (RSP '07), 2007, pp. 57-60.

U.S. Patent and Trademark Office, Reply to Office Action mailed Apr. 12, 2011 which filed on Jul. 6, 2011.

* cited by examiner

PROVIDING A PERIPHERAL COMPONENT INTERCONNECT (PCI)-COMPATIBLE TRANSACTION LEVEL PROTOCOL FOR A SYSTEM ON A CHIP (SOC)

This application is a continuation of U.S. patent application Ser. No. 12/156,320, filed May 30, 2008 now U.S. Pat. No. 7,861,027, entitled "PROVIDING A PERIPHERAL COMPONENT INTERCONNECT (PCI)-COMPATIBLE TRANSACTION LEVEL PROTOCOL FOR A SYSTEM ON A CHIP (SoC)," the content of which is hereby incorporated by reference.

BACKGROUND

Certain semiconductor architectures such as advanced extensible interface (AXI) and open core protocol (OCP)-based architectures are modular and allow for rapid proliferation by quickly adding or deleting intellectual property (IP) blocks from an existing design. Though these IP blocks (also referred to as IPs) offer a rich set of functionality, they cannot be used in a personal computer (PC) system, as they lack some key features required for peripheral component interconnect (PCI) compatibility. For example, these IPs operate at fixed addresses, precluding plug-and-play; there is no mechanism for discovery and enumeration; PCI-style ordering is not implemented; and PCI-style power management features are missing.

For peripheral devices for use in PC-compatible systems, interconnect specifications mix the transaction level with the physical level for the interfaces. Indeed, since these specifications cover external, physical devices, both of these levels need to be defined. However, for system on a chip (SoC) systems, mixing the transactional level with the physical level of the interface definition limits reuse of components as silicon processes change. Some external, non-PC-compatible systems have adopted transactional-level interfaces for their IP components. However, these systems cannot be made PC-compatible because various features are missing in their interfaces that are needed for PC compatibility.

DETAILED DESCRIPTION

Figure 1:
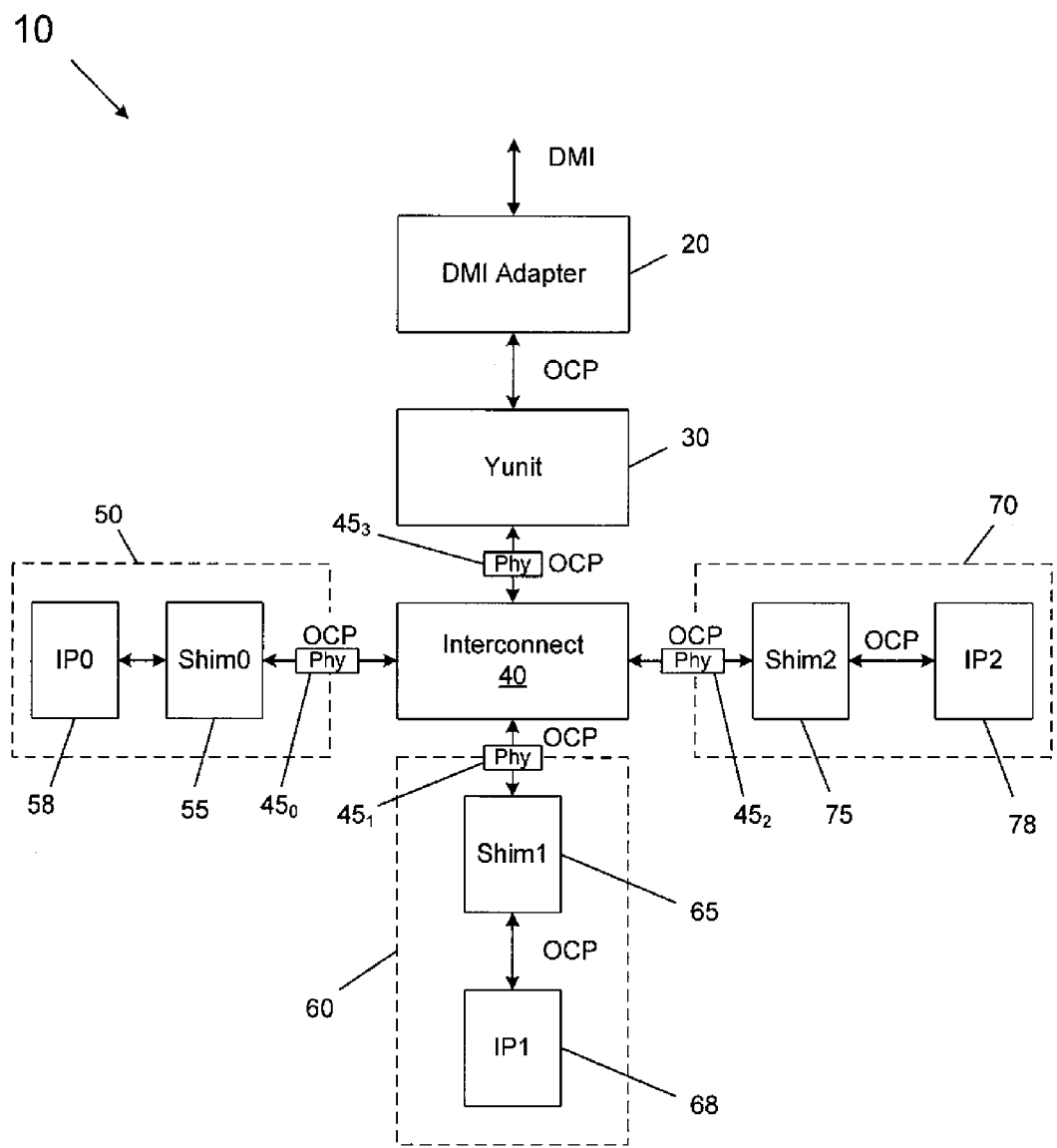
FIG. 1 is a block diagram of a processor in accordance with one embodiment of the present invention.

Embodiments use a technique that enables use of heterogeneous resources, such as AXI/OCP technologies, in a PC-based system such as a PCI-based system without making any changes to the IP resources themselves. More specifically, embodiments provide a transaction-level modular interconnect for PC-compatible SoC components. That is, since component reuse can aid in realization of rapid development of SoC components, the transactional level can be separated from the physical level of the specification definition for SoC components, in various embodiments. In this way, the following features can be realized: the ability to map a PCI (or other bus-based) system to a point-to-point (PtP) interconnect system; the ability to provide target-based decoding to a PtP interconnect system; and the ability, through logic, to use existing components that do not already provide target-based decoding and other PC compatible functions in a PC-compatible system.

Mapping of PCI transactions as implemented by a PC-compatible system to a non-PCI-transaction space as implemented by a SoC to be incorporated into the PC-compatible system raises issues. Specifically, PCI is typically a target-based decode system, meaning that when a processor wants to communicate with a peripheral device, it sends the transaction to all peripheral devices, and waits for a device to claim it. Once claimed by one of the devices, a channel is established between the processor and corresponding device so they can communicate. Such a system does not work well with an on-die system, such as a SoC, which typically operates using source-based decode. Instead in such a system, a processor sends an address to an interconnect and the interconnect determines its destination, and only sends that request to the particular device that is targeted by the request, rather than sending it to all devices and waiting for a response.

In various embodiments, an interface or adapter may be used to keep track of all of the different target addresses in a system and collect and maintain configuration information. Thus when a processor sends requests, rather than sending the requests to all the peripheral devices, they are only sent to an adapter associated with the target device.

Embodiments provide two very thin hardware blocks, referred to herein as a Yunit and a shim, that can be used to plug AXI/OCP IP into an interconnect fabric to create PCI-compatible systems. As will be described below, in one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

Two pieces of PCI functionality may be incorporated in the separated transaction-physical protocol in accordance with an embodiment of the present invention. First, the Yunit may include decode logic to determine where a request is targeted, and to ensure that the request is delivered properly through the interconnect. Second, the shim may include control register functionality such as control information for turning the corresponding device off, obtaining access to a particular memory region, or so forth. Thus PCI header functionality may be split into two pieces, one to a shim that is tied specifically to particular functionality in the device itself, and the second part to the Yunit because it is tied to the routing of commands within the SoC. As such, PCI incremental functionality of a component is split into two pieces, namely the shim which sits next to the IP core and the Yunit in connection with a requester as the address of the target is unknown.

The Yunit implements PCI enumeration by translating PCI configuration cycles into transactions that the target IP can understand. This unit also performs address translation from re-locatable PCI addresses into fixed AXI/OCIP addresses and vice versa. The Yunit may further implement an ordering mechanism to satisfy a producer-consumer model (e.g., a PCI producer-consumer model). Thus the Yunit may be provided with logic that would normally be incorporated in a peripheral device to claim a particular request (i.e., decoded) to the Yunit and then decodes the request, determines which peripheral device is targeted for that request, and then sends the request only to the specific device. Thus in various embodiments, an adapter may perform PCI-PtP conversion.

In turn, individual IPs are connected to the interconnect via dedicated PCI shims. Each shim may implement all PCI header functionality for the corresponding IP, although the Yunit can perform address decoding. As such, the Yunit routes all accesses to the PCI header and the device memory space to the shim. The shim consumes all header read/write transactions and passes on other transactions to the IP. In some embodiments, the shim also implements all power management related features for the IP.

Referring now to FIG. 1, shown is a block diagram of a processor in accordance with one embodiment of the present invention. As shown in FIG. 1, processor 10 may be a system on a chip (SoC) or other integrated circuit that can be formed on a single semiconductor die. In the embodiment of FIG. 1, processor 10 may include various heterogeneous resources that can be coupled to an interface to provide the ability to communicate and control these various heterogeneous resources using standard PC signaling mechanisms, such as a PCI protocol, although the scope of the present invention is not limited in this regard.

As shown in FIG. 1, processor 10 may include an adapter 20 which, in one embodiment may be a DMI adapter having a first interface that can communicate according to a given protocol, e.g., a DMI protocol. However in other implementations adapter 20 may communicate using this first interface according to a PCI, PCIe or other such PC-based communication protocol. Accordingly, communications with an upstream component, which may be another part of the SoC, or a different component such as a chipset component of a PC, e.g., an input/output controller hub (ICH) may occur according to the given PC protocol, e.g., the DMI protocol shown in FIG. 1.

In turn, downstream communications can occur according to a non-PC communication protocol such as the OCP protocol shown in FIG. 1, although other implementations are certainly possible.

Adapter 20 communicates with a Yunit 30, which as described above may handle various PCI or other such PC-based operations. On its downstream side Yunit 30 may be coupled to an interconnect 40, which may provide interconnection and routing of communications between Yunit 30 and a plurality of different heterogeneous resources. In the embodiment shown in FIG. 1, such resources include a first resource 50, a second resource 60, and a third resource 70, each of which may represent a given heterogeneous resource such as a given IP block of one or more third parties. Each heterogeneous resource may be configured differently to perform one or more specialized functions.

Still referring to FIG. 1, interconnect 40 may be coupled to each resource and Yunit 30 via an interconnect, e.g., an OCP interconnect. As illustrated in FIG. 1, a physical unit $45_{a-c}$ (each coupled between a corresponding resource and interconnect 40, and generically physical unit 45) may include logic, circuitry, and so forth to act as an interface to the transaction layer to translate transactions into actual bits and bytes to be transmitted on physical interconnect lines. Thus between each resource and interconnect 40 is a physical unit 45 to provide for transaction layer-to-physical layer and physical layer-to-transaction layer transitions. While shown as a single unit for ease of illustration, understand that separate physical units may be coupled at each end of a physical wire.

Each resource includes a shim to connect the resource to interconnect 40. The shims may be used to perform all PCI-related operations except for addressing decoding functionality to be performed by Yunit 30, such that communication between the shim and the respective IP block of the resource can be by the underlying protocol of the IP block. Thus as shown in FIG. 1, resource 50 includes a shim 55 coupled to an IP block 58 by an interconnect such as an OCP-based interconnect. Similarly, resource 60 includes a shim 65 coupled to an IP block 68 by a OCP interconnect. Also shown in FIG. 1 is a resource 70 that includes a shim 75 coupled to an IP block 78 by an OCP interconnect. While shown with this particular implementation in the embodiment of FIG. 1, the scope of the present invention is not limited in this regard.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP.

Embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

Figure 2:
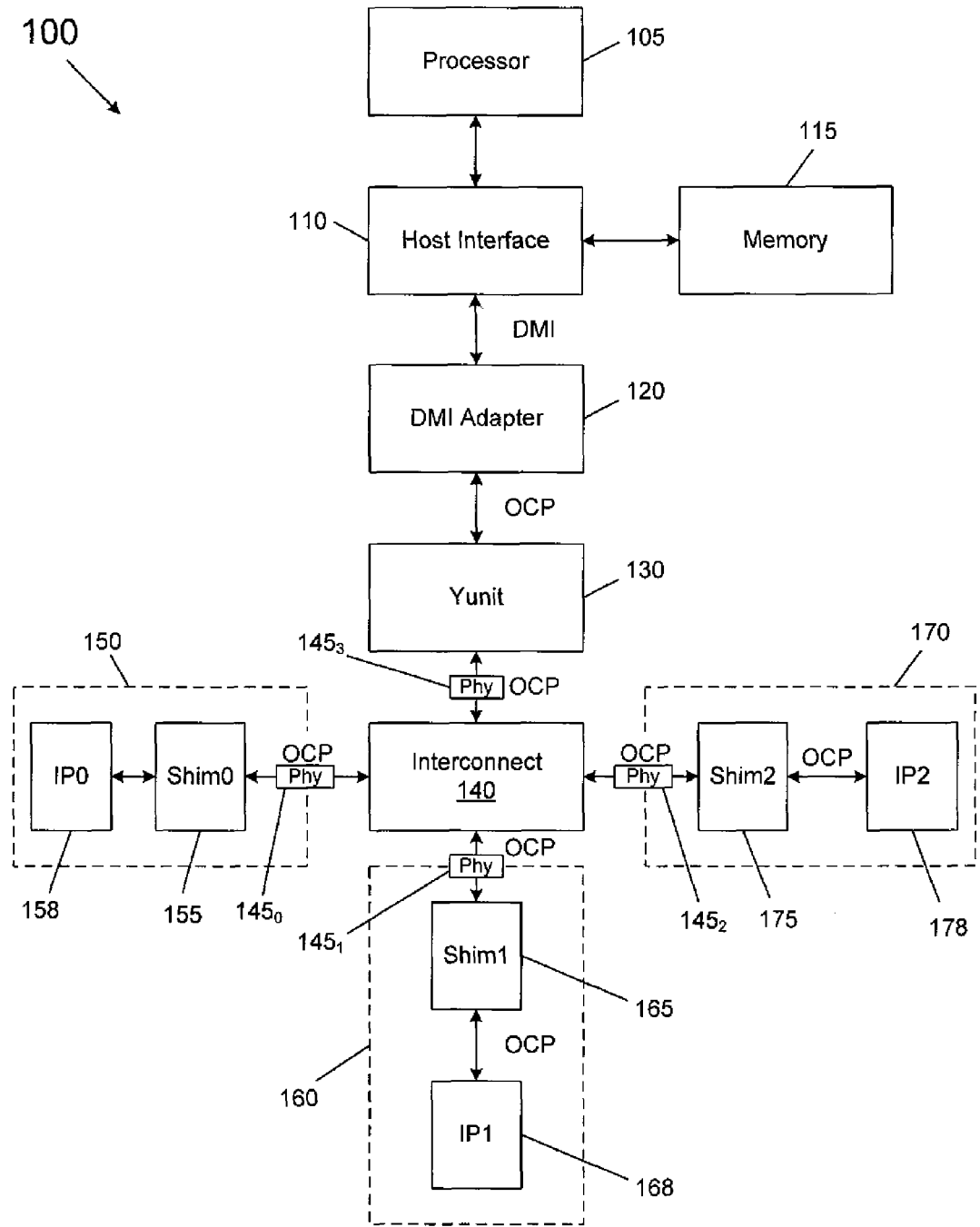
FIG. 2 is a block diagram of a system in accordance with one embodiment of the present invention.

FIG. 2 is a block diagram of a system in accordance with one embodiment of the present invention. System 100 may be a PC-based system, such as a PCI-based system that can be implemented in different form factors, from a desktop system to a laptop to an ultra-mobile PC. As shown in FIG. 2, system 100 includes a processor 105 coupled to a host interface 110, which in turn is coupled to a memory 115, such as a dynamic random access memory (DRAM), and in turn to DMI adapter 120, e.g., via a DMI bus. DMI adapter 120 may also be coupled to a SoC such as that shown in FIG. 1, enumerated as components 130-170 in the embodiment of FIG. 2. Processor 105 may be, in some embodiments, a low power processor that can execute a PC-based operating system (OS) such as a WINDOWS™ or LINUX™ OS that uses a PCI or other such PC protocol, although certain components of the system may be of another protocol, e.g., AXI or OCP.

Thus PCI-type transactions can be mapped to IP blocks, which may be interconnected in a PtP fashion. Thus, interconnects such as based on an OCP or AXI protocol that support basic PtP communication between a requester and a target may be extended to support PCI bus-header functionality and target-based decode.

In addition, IP block reuse across different SoC devices may be aided by separating a transaction level from a physical level. That is, a transaction level specifies the kinds of requests that an interconnect can handle and the physical level describes the way in which the transactions travel from one point to another point. By separating those two levels out, an IP can transcend multiple generations of implementation. In other words, an interconnect itself is likely to change when different generations have differently sized transistors (e.g., of different semiconductor processes) or different implementations, e.g., from an SoC to an implementation that includes multiple die. However, the transaction layer remains the same while the interconnect layer changes. In this way, the physical layer can change independently of the transaction layer. For example, the transaction layer can be consistent across multiple generations, and across multiple physical layers. In contrast, if a physical layer was incorporated into the IP blocks, significant changes could occur from generation to generation that would prevent efficient IP block reuse.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an adapter adapted on a single semiconductor die to communicate with a first component according to a peripheral component interconnect (PCI) protocol and to communicate with a first interface according to a second protocol corresponding to an open core protocol (OCP) protocol;
the first interface adapted on the single semiconductor die to perform address translation and ordering of transactions received from the first component;
a first physical unit coupled between the first interface and an interconnect to communicate the transactions between the first interface and the interconnect; and
the interconnect adapted on the single semiconductor die to couple the first interface to a plurality of heterogeneous resources adapted on the single semiconductor die, each of the plurality of heterogeneous resources including an intellectual property (IP) core and a shim, wherein the shim is to implement a PCI header of the PCI protocol for the IP core, wherein the apparatus is to operate according to the PCI protocol and the IP core is to operate according to the second protocol.

2. The apparatus of claim 1, wherein the first interface is to translate configuration cycles of the PCI protocol into a format for the second protocol.

3. The apparatus of claim 2, wherein the first interface is to perform the address translation to translate a re-locatable PCI address into an OCP address.

4. The apparatus of claim 1, wherein the first interface is to perform operations that are common across the plurality of heterogeneous resources, and each shim is to perform operations that are specific to the corresponding IP core.

5. The apparatus of claim 4, wherein the common operations include the address translation and the ordering, and the specific operations include low power management and error handling.

6. The apparatus of claim 1, wherein the interconnect comprises an interconnect fabric.

7. The apparatus of claim 6, further comprising a plurality of second physical units each to couple the interconnect to a corresponding one of the plurality of heterogeneous resources.

8. The apparatus of claim 1, wherein the first interface is to route accesses to a PCI header to a corresponding shim, and to route accesses to a device memory space to the corresponding shim.

9. The apparatus of claim 8, wherein the corresponding shim is to consume all read-write operations to the PCI header and is to communicate other transactions to the corresponding IP core.

10. A system comprising:
a processor;
a host interface coupled to the processor, the host interface to couple the processor to a memory and an adapter;
the adapter coupled to the host interface to communicate according to a first protocol and to communicate with a second interface according to a second protocol;
the second interface coupled to the adapter and to perform address translation and ordering of transactions received from the processor;
a first physical unit coupled between the second interface and an interconnect to communicate the transactions between the second interface and the interconnect, wherein the interconnect is to couple the second interface to a plurality of heterogeneous resources, each of the plurality of heterogeneous resources including an intellectual property (IP) core and a shim, wherein the shim is to implement a header of the first protocol for the IP core, wherein the system is to operate according to the first protocol and the IP core is to operate according to the second protocol.

11. The system of claim 10, wherein the system comprises an ultra mobile system, wherein the processor is to execute an operating system using the first protocol.

12. The system of claim 11, wherein the second interface is to translate configuration cycles of the first protocol into a format for the second protocol, wherein the second interface is to perform the address translation to translate a re-locatable peripheral component interconnect (PCI) address into an advanced extensible interface/open core protocol (AXI/OCP) address.

13. The system of claim 12, wherein the second interface is to perform operations that are common across the plurality of heterogeneous resources, and each shim is to perform operations that are specific to the corresponding IP core, the common operations including the address translation and the ordering, and the specific operations including low power management and error handling.

14. The system of claim 12, wherein the second interface is to route accesses to a PCI header to a corresponding shim, and to further route accesses to a device memory space to the corresponding shim and wherein the corresponding shim is to consume all read-write operations to the PCI header and is to communicate other transactions to the corresponding IP core.

15. A method comprising:
communicating, via an adapter, with a first component according to a peripheral component interconnect (PCI) protocol and communicating with a first interface according to an open core protocol (OCP) protocol;
performing address translation and ordering of transactions received from the first component via the first interface, the first interface coupled to the adapter by a first interconnect;
communicating the transactions between the first interface and a second interconnect via a first physical unit coupled between the first interface and the second interconnect; and implementing a PCI header of the PCI protocol for an intellectual property (IP) core that operates according to the OCP protocol via a shim coupled to the second interconnect.

16. The method of claim 15, further comprising translating configuration cycles of the PCI protocol into a format for the OCP protocol via the first interface.

17. The method of claim 15, further comprising performing the address translation to translate a re-locatable PCI address into an OCP address.

18. The method of claim 15, further comprising performing operations that are common across a plurality of heterogeneous resources each having a corresponding shim, via the first interface, wherein each shim is to perform operations that are specific to the corresponding heterogeneous resource.

19. The method of claim 15, further comprising routing accesses to a PCI header to the shim.

20. The method of claim 15, further comprising consuming read-write operations to the PCI header in the shim, and communicating other transactions to the IP core via the shim.

* * * * *